June 8, 1937.                J. C. DUCOMMUN                2,083,011
                              TEST HOLE DEVICE
                       Filed Dec. 31, 1935            2 Sheets-Sheet 1

INVENTOR
Jesse C. Ducommun
BY
Bruce K. Brown
ATTORNEY

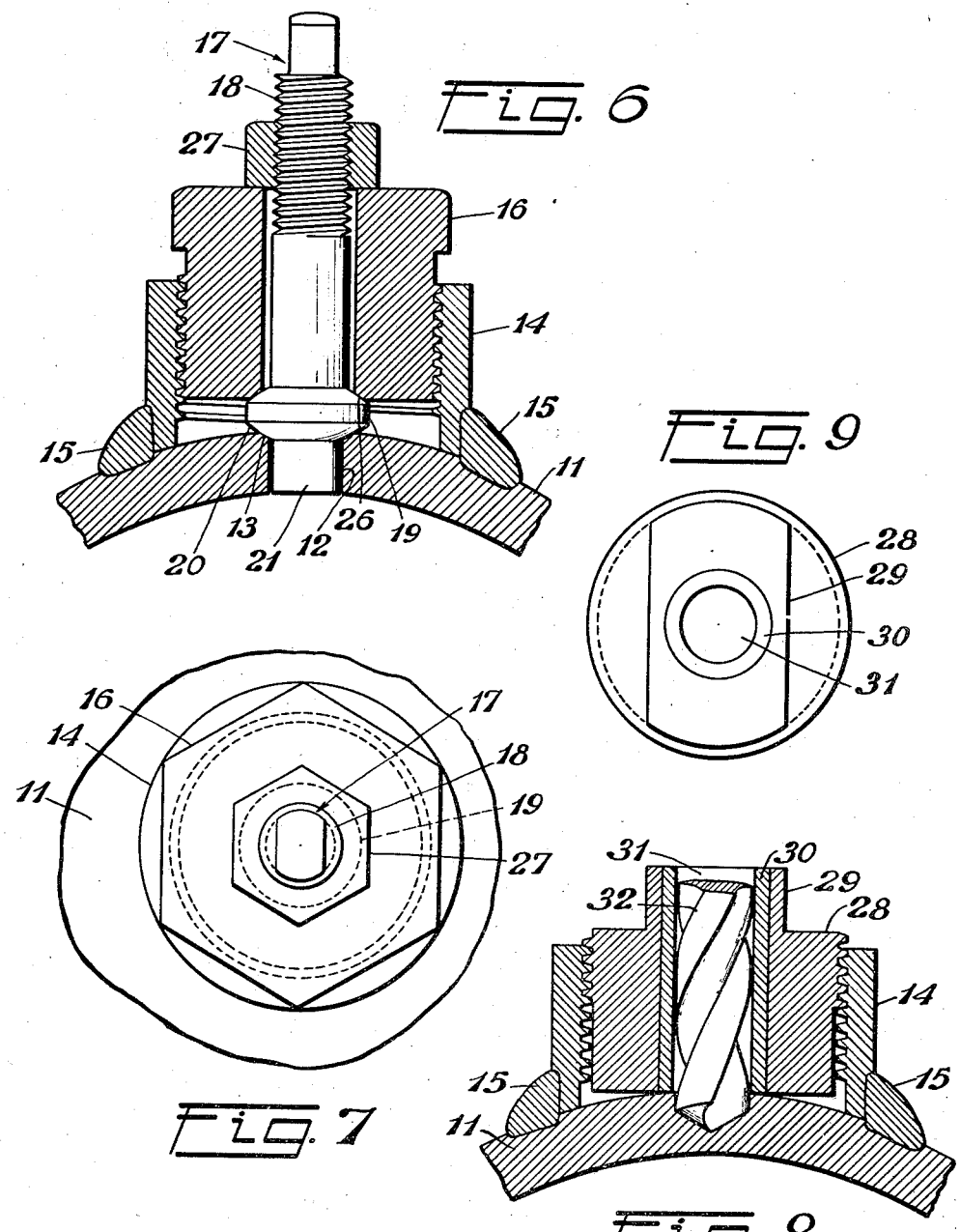

Patented June 8, 1937

2,083,011

UNITED STATES PATENT OFFICE 2,083,011

TEST HOLE DEVICE

Jesse C. Ducommun, Hammond, Ind., assignor to Standard Oil Company, Chicago, Ill., a corporation of Indiana Application December 31, 1935, Serial No. 56,996

10 Claims. (Cl. 138—36)

This invention relates to a test hole device or, in other words, to a device to permit the measurement of the thickness of the wall of an article such as a pressure vessel, reaction chamber, fractionating chamber, pipe line, etc.

Articles of the types mentioned are frequently subjected to corrosion, erosion and other forces tending to reduce the wall thickness. It therefore becomes necessary, particularly in the case of vessels and lines subjected to pressure, to measure the wall thickness from time to time in order to determine whether or not the article is in safe condition for further use. This is especially important in the case of oil refinery equipment in order to minimize fire and explosion hazards.

The testing of wall thickness is conducted while the article in question is temporarily out of service, which normally occurs from time to time. In the case of metal oil refinery equipment, the usual method has been to drill a hole through the wall of the article, insert a pair of calipers through the hole, measure the wall thickness, tap the hole, screw a plug into the tapped hole, cut the plug off flush with the hole and weld it in place. This is a time-consuming operation. Moreover it necessitates that the next test hole be drilled at another location and it is therefore impossible to check the wall thickness at the same point after further operation. Since the point originally chosen is usually that at which maximum corrosion or erosion is expected, this is highly undesirable.

Furthermore, the prior method which involves welding a plug in place cannot be used in the case of certain structural materials, such for instance, as alloy steels of the type containing about 4% to 6% chromium and usually about 0.5% molybdenum. When welded and allowed to cool, these alloy steels "air harden" and become brittle. It is therefore necessary to heat treat them to restore the desired properties and this cannot be done without dismantling the equipment and taking it back to the shops. Furthermore, there are some structural materials which cannot be welded at all.

It is an object of my invention to overcome the aforementioned and other difficulties of the prior art by providing a test hole device by means of which the thickness of a wall can be repeatedly measured at the same point. Another object of my invention is to provide a test hole device the use of which does not involve any welding operation once the device is installed. A further object of my invention is to provide a test hole device which facilitates the testing operation. Other and more detailed objects of my invention will become apparent as the description thereof proceeds.

Certain preferred embodiments of my invention will now be described in connection with the accompanying drawings which illustrate certain preferred embodiments thereof. These drawings form a part of this specification.

In the drawings:

Figure 6 is an elevation partly in section showing another form of test hole device in accordance with my invention;

Figure 7 is a plan view corresponding to Figure 6;

Figure 8 is an elevation partly in section showing a preferred method of drilling the test hole; and Figure 9 is a partial plan view corresponding to Figure 8.

In the drawings like numerals indicate like or corresponding parts.

Figure 1:
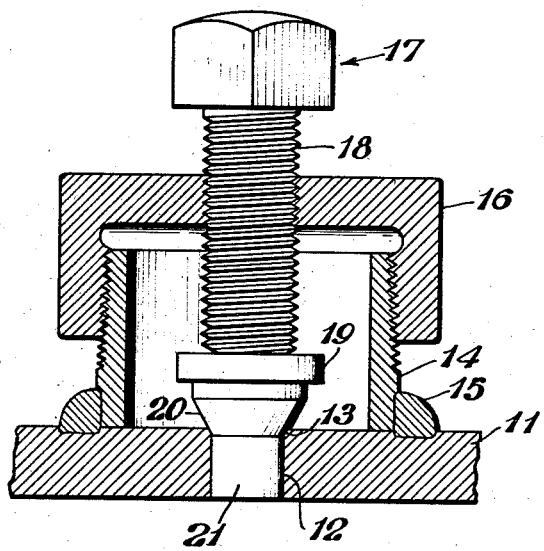
Figure 1 is an elevation partly in section showing a test hole device in accordance with my invention.
Figure 3:
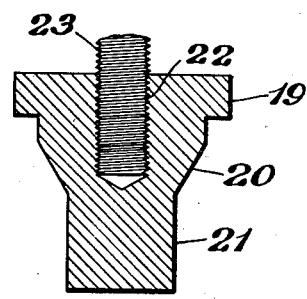
Figure 3 is a detail sectional elevation of the plug used in the test hole device of Figure 1.
Figure 2:
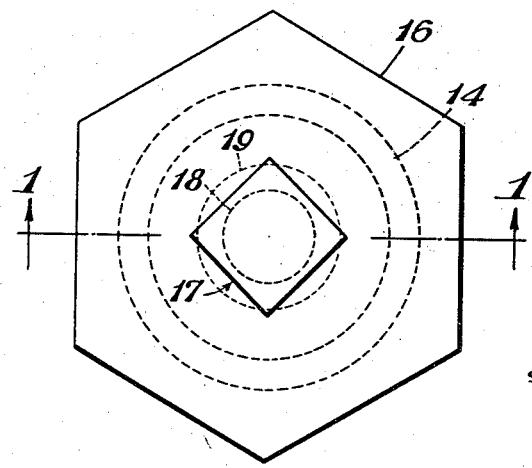
Figure 2 is a plan view corresponding to Figure 1.

Referring more particularly to Figures 1 to 5, it will be seen that wall 11 of an article of the type mentioned is provided with a hole 12. The top of the hole 12 has a bevelled surface 13. An annular member 14 which may suitably be a pipe nipple surrounds hole 12 but is spaced therefrom. Annular member 14 is fastened to or integral with wall 11. As shown, it is welded to wall 11 by means of a circumferential weld 15.

A removable bonnet or cover cap 16 is attached to annular member 14. The two together constitute a plug holder. Bonnet 16 carries a threaded central aperture adapted to receive a stem 17. As shown stem 17 is an ordinary square headed bolt provided with threads 18 which cooperate with the threads in bonnet 16.

Hole 12 is plugged by removable plug 19 which is provided with a bevelled portion 20. This bevelled surface forms a seat with bevel 13 of wall 11. Plug 19 is also provided with a portion 21 which fits tightly into hole 12. Stem 17 is adapted to exert pressure on plug 19 and hold it in place as shown.

Annular member 14 can be welded in place at the time the article is originally fabricated and can be subjected to the normal final heat treatment along with the article so that no field welding is necessary.

The thickness of wall 11 is determined when the article is not in use by loosening stem 17, removing bonnet 16 and plug 19 and inserting a pair of calipers through hole 12. Plug 19, bonnet 16 and stem 17 are then replaced. Alternatively, the thickness of wall 11 can be measured indirectly by measuring the height of portion 21 of plug 19 since if plug 19 is made of the same material as wall 11 it will corrode and/or erode at the same rate as wall 11.

Plug 19 should preferably be made of the same material as wall 11 in order to avoid electrolytic corrosion. The bottom of part 21 should preferably be cut off flush with the lower surface of wall 11.

Figure 4:
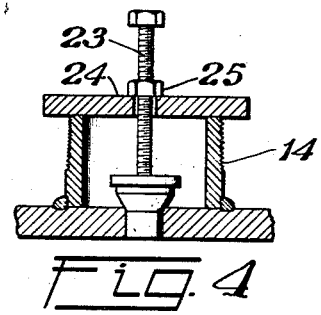
Figure 4 is an elevation partly in section showing the method of removing the plug used in the device of Figure 1.
Figure 5:
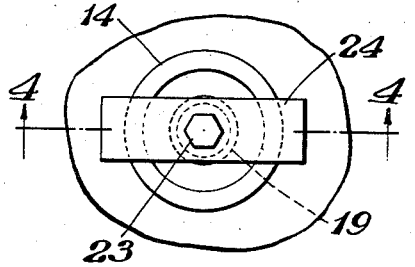
Figure 5 is a partial plan view corresponding to Figure 4.

Plug 19 is preferably provided with a centrally tapped hole 22 of lesser diameter than the diameter of the lower portion of stem 17. Thus the removal of plug 19 can be accomplished as shown in Figure 4 by means of bolt 23. One convenient method of accomplishing this withdrawal is to use a flat strip or bridge 24 laid across the top of annular member 14. This strip is provided with a central aperture through which bolt 23 is inserted. Nut 25 is screwed down into contact with bridge 24 and plug 19 can then be lifted by rotating bolt 23. Instead of using a bridge 24, bonnet 16 can be used for this purpose but in this case nut 25 must be larger than the central aperture in bonnet 16.

Another modification of my device is shown in Figures 6 and 7. In this case wall 11 is shown as curved rather than flat and this necessitates notching or otherwise shaping the lower part of annular member 14 to provide at least a rough fit with wall 11.

As shown in Figure 6, bonnet 16 instead of being external to annular member 14 is internal. Also in this modification stem 17 and plug 19 are integrally connected to form a single piece although still serving the function of the separate elements shown in Figure 1.

In the device of Figure 6, bonnet 16 is provided with a bevelled surface 26 at its lower part and this cooperates with a corresponding bevelled surface on plug 19. This tends to hold plug 19 in place and in this modification stem 17 could be dispensed with. However, it is desirable to use stem 17, as shown, in order to give additional rigidity. In the device illustrated in Figure 6 threads 18 of stem 17 cooperate with a nut 27 which is screwed down in contact with bonnet 16.

In either the device of Figure 1 or the device of Figure 6 it is, of course, necessary to have hole 12 centrally spaced with respect to annular member 14 and the best way to accomplish this is to drill hole 12 after annular member 14 is welded in place. One highly satisfactory method of accomplishing this is shown in Figures 8 and 9 in which a jig 28 is inserted in annular member 14. As shown, jig 28 is provided with an upper flattened portion 29 which is used in screwing it into position. Jig 28 is also preferably provided with a hardened steel bushing 30 surrounding a central aperture 31 through which drill 32 is inserted. Jig 28 thus serves to guide drill 32 and to insure central placing of the hole 12. After hole 12 has been drilled and bevel 13 has been formed, the test hole device is assembled as shown in Figure 6 or Figure 1.

It will be understood that instead of using different structures for bonnet 16 and jig 28, a single structure can be used for both purposes.

While I have described my invention in connection with certain specific embodiments thereof, it is to be understood that I am not limited thereby but only to the subject matter of the appended claims which should be construed as broadly as the prior art will permit.

I claim:

1. A test hole device for an article having a wall with a hole therein which comprises an annular member surrounding said hole but spaced therefrom, a removable plug to fit said hole, a stem for said plug and removable means cooperating with said annular member and with said stem for holding said plug in position in said hole.

2. A test hole device for an article having a wall with a hole therein which comprises an annular member surrounding said hole but spaced therefrom and attached to said wall, a removable plug to fit said hole, a stem for said plug and a removable bonnet cooperating with said annular member and with said stem to hold said plug in position in said hole.

3. A test hole device for a metal article having a wall with a hole therein which comprises a pipe nipple welded to said wall surrounding said hole but spaced therefrom, a removable plug to fit said hole, said plug having a bevelled seat cooperating with a bevelled portion of said wall at the top of said hole, a stem for said plug and a removable bonnet cooperating with said pipe nipple and with said stem to form a rigid assembly when said plug is in place.

4. A test hole device for a metal article having a wall with a hole therein which comprises a threaded pipe nipple welded to said wall and surrounding said hole but spaced therefrom, a plug to fit said hole, a bonnet having threads cooperating with the threads on said nipple, said bonnet serving to hold said plug in position in said hole.

5. A test hole device for a metal article having a wall with a hole therein which comprises a threaded pipe nipple welded to said wall and surrounding said hole but spaced therefrom, a plug to fit said hole, said plug having a bevelled seat cooperating with a bevelled portion of said wall at the top of said hole, a bonnet having threads cooperating with the threads on said nipple and adapted to hold said plug in position in said hole, a stem attached to said plug and projecting through said bonnet, said stem being threaded over a portion of its length and a nut cooperating with said threads and with said bonnet to hold said stem in place.

6. A test hole device for a metal article having a wall with a hole therein which comprises a threaded pipe nipple welded to said wall surrounding said hole but spaced therefrom, a plug having a portion to fit said hole and a bevelled seat to cooperate with a bevelled portion of said wall at the top of said hole, a threaded cover cap to fit said threaded nipple, said cover cap being centrally threaded, and a threaded stem to fit said centrally threaded cover cap, said stem cooperating with said cover cap to hold said plug in position in said hole.

7. A test hole device according to claim 6 in which the top of said plug is tapped to receive means for removing said plug from said hole.

8. A test hole device for an article having a wall with a hole therein which comprises a plug holder at least part of which is attached to said wall in the vicinity of said hole, a removable plug to fit said hole, a stem for said plug, and means carried by said plug holder and by said stem for holding said plug in said hole and for permitting the removal of said plug from said hole.

9. A test hole device for an article having a wall with a hole therein which comprises a plug holder at least part of which is attached to said wall in the vicinity of said hole, a removable plug to fit said hole, a stem for said plug, said plug holder and said stem being equipped with corresponding screw threads whereby said plug can be held in position in said hole or removed therefrom.

10. A test hole device for an article having a wall with a hole therein which comprises a member attached to said wall in the vicinity of said hole but spaced therefrom, a removable plug to fit said hole, a stem for said plug and removable means cooperating with said member and with said stem for holding said plug in position in said hole.

JESSE C. DUCOMMUN.